Feb. 19, 1924.  1,483,981
E. L. MEGILL
PRINTING PRESS GAUGE
Filed March 18, 1920
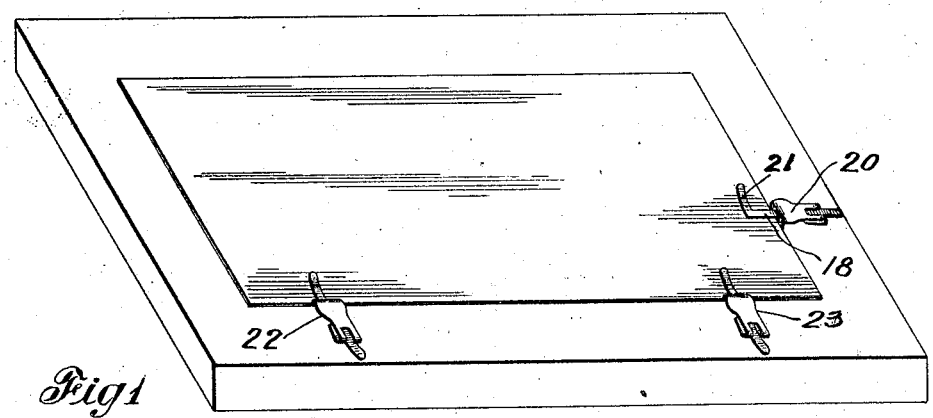
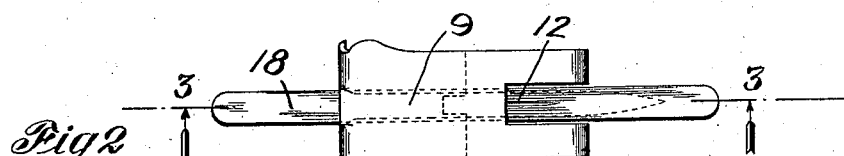
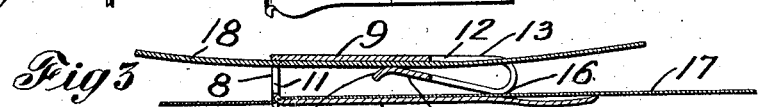
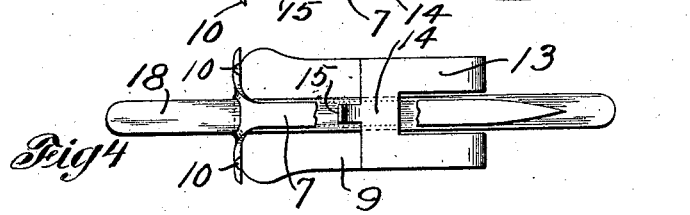
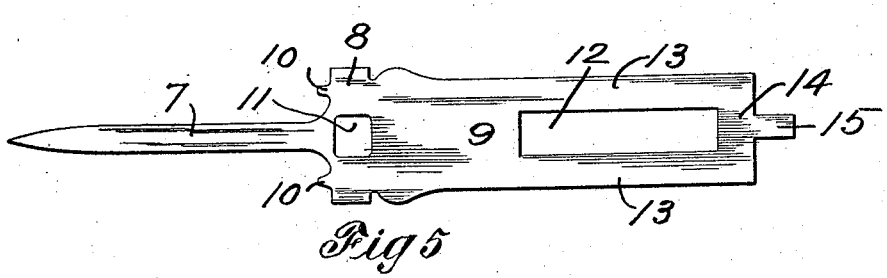
Edward L. Megill INVENTOR
BY
Frank J. Kent ATTORNEY Patented Feb. 19, 1924.

1,483,981

UNITED STATES PATENT OFFICE.

EDWARD L. MEGILL, OF NEW YORK, N. Y.; ALFRED V. HART EXECUTOR OF SAID EDWARD L. MEGILL, DECEASED.

PRINTING-PRESS GAUGE.

Application filed March 18, 1920. Serial No. 366,769.

*To all whom it may concern:*

Be it known that I, EDWARD L. MEGILL, a citizen of the United States, residing at New York, in the county of New York and State of New York, have invented certain new and useful Improvements in Printing-Press Gauges, of which the following is a specification.

This invention relates to feed gauges of the type which are secured to the tympan sheet and which are ordinarily known as gauge pins.

The objects of the invention are to provide a gauge pin of simple, inexpensive and durable construction and further to provide such a gauge with a readily adjustable and automatically held gauge tongue.

A further object of the invention is to provide a gauge tongue especially adapted for guiding the edge portion of the sheet.

Other objects and aims of the invention than those stated, together with the novel features of the invention will be in part obvious and in part specifically referred to in the course of the following description of the elements, combinations and arrangements of parts; and the broad scope of protection contemplated will appear from the claims.

In the accompanying drawing which is to be taken as a part of the specification and in which I have shown merely one preferred embodiment of the invention, Figure 1 is a perspective view of three of the gauges as applied to a tympan sheet.

Figure 2 is a top plan view of one of the end gauges.

Figure 3 is a longitudinal sectional view of the same on substantially the plane of line 3—3 of Figure 2.

Figure 4 is a bottom plan view of this gauge with a portion of the lower member or prong indicated as broken away and Figure 5 is a plan view of the blank from which the body of the gauge is made.

Referring first to the blank from which the gauge is made, it will be noted that the same consists of a sheet metal blank embodying a prong portion 7, a vertical head portion 8 and a plate portion 9. The head or gauge face 8 has positioning points 10 projecting from one edge thereof and this head is provided with a guide passage 11 therethrough, between the top and bottom edges thereof.

The plate portion 9 is provided with a similar guide passage 12 therethrough in line with the guide passage in the head and dividing the rearward portion of the plate into separated arms 13 connected at the rear by a cross bar 14. Projecting rearward from the central portion of this cross bar and in line with the two guide passages 11 and 12 is a tab 15 which in the final form of the device is curled to form a lip.

In forming up the device from the blank, the head part 8 is bent at right angles to the plate portion 9 and the prong is bent under the plate portion so as to stand substantially parallel thereto, as indicated most clearly in Figure 3, to which view the reference characters heretofore used have been applied. The rearward portion of the top plate 9, that is the part involving the spaced arms 13, is bent under the top plate and directed toward the under side thereof. This provides a reverse bend 16 which co-operates with the prong 7 to grip the tympan sheet 17, without possibility of tearing or marring the latter.

This reversely bent portion also provides a spring clip for frictionally holding a gauge tongue 18 in position against the under side of the top plate, said gauge tongue being adjustably guided in the alined passages 11 and 12 in the head and in the reversely bent portion of the top plate respectively. The end of this clip, as represented by the tab 15, is bent outwardly, as shown in Figure 3, to form the lip previously referred to and which serves to frictionally grip the tongue at a single point of contact and also provides an inclined surface enabling the end of the gauge tongue to be readily inserted thereunder.

The device is applied to the tympan sheet in the usual way by inserting the prong beneath the sheet and permitting the point of the same to project up through the sheet at a point in rear of the reversely bent gripping portion of the top plate, the points at the head of the gauge being depressed when the device is in proper position to anchor it in such relation. The guide tongue may be longitudinally adjusted to a position where it will best perform its function of holding down the edge of the paper in proper engagement with the head of the gauge.

The construction, it will be apparent, is extremely simple and practical, in that the entire body of the gauge is made in but one piece, the reversely bent portion of the top plate being utilized both to serve as a means for gripping the top of the tympan sheet and also in respect of the cross bar 14 or tab 15 thereof as a spring clip for holding the gauge tongue against plate 9.

Where the device is used as an edge gauge for the sheet, as is the case at 20 in Figure 1, the longitudinally adjustable gauge tongue is preferably formed or provided with an angularly projecting extension 21 projecting in but wholly above the plane of the paper feed. This extension materially assists in guiding the sheet past the face of the gauge and also aids in passing the sheet in straightened condition on to the end gauges 22—23 for the lower edge of the sheet.

It will be apparent that the device of this invention can be inexpensively produced and that further while it is quite light in weight, it is of a durable construction and may be easily handled and adjusted, and that, further, it is well adapted to either machine or hand feeding.

I claim:—

1. A gauge comprising a head portion provided with a passage therethrough and a connected top portion having its end part bent under and directed toward the underside of the top portion to provide a clip, said top portion having a passage at the bend therein in line with the passage in the head, a gauge tongue slidingly engaged in said passages and adjustably held by the clip against the underside of the top and a member connected to the head and cooperating with the reversely bent part of the top to grip a tympan sheet.

2. A gauge comprising a head portion provided with a passage therethrough and a connected top portion having its end part bent under and directed toward the underside of the top portion to provide a clip, said top portion having a passage at the bend therein in line with the passage in the head, a gauge tongue slidingly engaged in said passages and adjustably held by the clip against the underside of the top, said clip having a reversely bent lip facing the guide passage in the head, and a member connected to the head and cooperating with the reversely bent part of the top to grip a tympan sheet.

3. A gauge comprising a head portion provided with a passage therethrough and a connected top portion having its end part bent under and directed toward the underside of the top portion to provide a clip, said top portion having a passage at the bend therein in line with the passage in the head, a gauge tongue slidingly engaged in said passages and adjustably held by the clip against the underside of the top, and a member connected with the head and arranged to enter between the separated parts provided by the guide passage in the reverse bend of the top.

4. A gauge comprising a head portion provided with a passage therethrough and a connected top portion having its end part bent under and directed toward the underside of the top portion to provide a clip, said top portion having a passage at the bend therein in line with the passage in the head, a gauge tongue slidingly engaged in said passages and adjustably held by the clip against the underside of the top, said clip having a reversely bent lip facing the guide passage in the head, and a member connected with the head and arranged to enter between the separated parts provided by the guide passage in the reverse bend of the top.

5. A gauge comprising a head portion and a connected generally flat top portion having an integral U-shaped part thereof bent upon itself to provide a clip, and a gauge tongue slidable between the arms of the U-clip and frictionally held by the cross-bar thereof against the surface of the top member.

6. A spring metal gauge pin comprising a top member having guide passages at its opposite ends and a reversely bent spring clip at one end, a gauge tongue engaged in said passages and held by the spring clip, a prong connected with the top plate and cooperating therewith to secure the device on a tympan sheet, the reversely bent portion of the top member having a passage to receive a part of the prong for the purpose of clamping the tympan sheet.

7. A gauge comprising a top plate having a head at one end and reversely bent spring arms at the opposite end, a guide passage in the head, a cross bar connecting the spring arms, and a gauge tongue guided in the passage and between the spring arms and engaged by the cross bar.

8. A gauge comprising a top plate having a head at one end and reversely bent spring arms at the opposite end, a guide passage in the head, a cross bar connecting the spring arms, a lip on said cross bar opposite the passage in the head, a gauge tongue guided in the passage and between the spring arms and engaged by the lip on the cross bar, and a prong connected with the head and extending between the reversely bent portions of the spring arms.

9. In a device of the kind described, a pressure member adapted to be positioned under a tympan sheet, a pressure member connected to said first member and adapted to be positioned above the tympan sheet, a guide tongue mounted on the pressure member and a spring clip below and integral with the pressure member and yieldingly engaging said tongue, the clip having also portions lying on opposite sides of the first named pressure member.

10. In combination, a tympan, a gauge having a head vertical to the tympan and a member carried by the gauge wholly above the tympan and having a portion extending forwardly of the head above the lower edge thereof and provided with a sheet-guiding extension disposed transversely of the first named portion and inclined upwardly away from the tympan.

11. In combination, a tympan, a gauge having a head vertical to the tympan and a member carried by the gauge wholly above the tympan and having a portion extending forwardly of the head above the lower edge thereof and provided with a sheet-guiding extension disposed transversely of the first named portion and inclined upwardly away from the tympan, said member being held in adjustable relation to the head.

In testimony whereof I affix my signature.

EDWARD L. MEGILL.